(12) United States Patent
Kim (10) Patent No.: US 11,221,228 B2
(45) Date of Patent: Jan. 11, 2022

(54) VEHICLE, AND METHOD OF CONTROLLING THE SAME

(71) Applicants: HYUNDAI MOTOR COMPANY, Seoul (KR); KIA MOTORS CORPORATION, Seoul (KR)

(72) Inventor: Sunkyung Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 139 days.

(21) Appl. No.: 16/702,122

(22) Filed: Dec. 3, 2019

(65) Prior Publication Data

US 2020/0318985 A1  Oct. 8, 2020

(30) Foreign Application Priority Data

Apr. 8, 2019 (KR) .................. 10-2019-0040570

(51) Int. Cl.
  *G01C 21/34* (2006.01)
  *G01C 21/36* (2006.01)

(52) U.S. Cl.
  CPC ..... *G01C 21/3484* (2013.01); *G01C 21/3492* (2013.01); *G01C 21/3626* (2013.01); *G01C 21/3629* (2013.01)

(58) Field of Classification Search
  CPC ........... G01C 21/3484; G01C 21/3626; G01C 21/3629; G01C 21/3492
  See application file for complete search history.

(56) References Cited

U.S. PATENT DOCUMENTS

2004/0015291 A1 * 1/2004 Petzold .............. G01C 21/3484
                                                   701/424
2017/0200449 A1 * 7/2017 Penilla .................. G10L 15/063

* cited by examiner

*Primary Examiner* — Anne Marie Antonucci
(74) *Attorney, Agent, or Firm* — Slater Matsil, LLP

(57) ABSTRACT

A vehicle and a control method thereof are provided. The vehicle may include a sensor configured to acquire behavior data of the vehicle; a communicator configured to communicate with a server; an user interface configured to receive commands from a user and provide route guidance information; and a controller configured to acquire first user propensity information from the server through the communicator, determine second user propensity information based on the behavior data of the vehicle, compare the first user propensity information with the second user propensity information, and provide route guidance information through the user interface based on a comparison result.

24 Claims, 8 Drawing Sheets

VEHICLE, AND METHOD OF CONTROLLING THE SAME

CROSS-REFERENCE TO RELATED APPLICATION(S)

The present application claims priority to and the benefit of Korean Patent Application No. 10-2019-0040570, filed on Apr. 8, 2019, which is incorporated herein by reference in its entirety.

TECHNICAL FIELD

The present disclosure relates to a vehicle capable of providing route guidance information suitable for a user's usual propensity and a control method thereof.

BACKGROUND

The statements in this section merely provide background information related to the present disclosure and may not constitute prior art.

Generally, a navigation device generates route guidance information based on a Global Positioning System (GPS) signal and map information, and provides route guidance information to the user. Conventional navigation devices provide route guidance information by voice, and such route guidance information and route guidance voices are predefined irrespective of the driver's personality or driving style.

That is, the conventional navigation device only provides route guidance information in a certain manner and provides the route guidance information in a constant voice. Therefore, the conventional navigation device may not differentiate the way of providing route guidance information in response to the user's propensity, and may not express emotion or character corresponding to the user's propensity.

SUMMARY

One aspect of the disclosure provides a vehicle capable of comparing user's usual propensity information with current propensity information and performing at least one of providing route guidance information and operating various functional devices based on the comparison result, and a control method thereof.

Additional aspects of the disclosure will be set forth in part in the description which follows and, in part, will be obvious from the description, or may be learned by practice of the disclosure.

In accordance with an aspect of the disclosure, a vehicle includes a sensor configured to acquire behavior data of the vehicle; a communicator configured to communicate with a server; an user interface device configured to receive commands from a user and provide route guidance information; and a controller configured to acquire first user propensity information from the server through the communicator, determine second user propensity information based on the behavior data of the vehicle, compare the first user propensity information with the second user propensity information, and control the user interface device to provide route guidance information based on the comparison result The controller may determine the second user propensity information as a Patient Style, a Normal Style, or a Hasty Style.

When the first user propensity information and the second user propensity information are the same, the controller may provide the route guidance information based on the first user propensity information.

The vehicle may further include a navigation system configured to acquire road information and traffic information, the controller may determine a driving situation based on the road information and the traffic information, and acquire the first user propensity information corresponding to the driving situation.

When the driving situation is an access road congestion state and the first user propensity information and the second user propensity information are the same, the controller may adjust a point at which the lane change is guided to the access road based on the first user propensity information.

When the driving situation is a traffic light change situation and the first user propensity information and the second user propensity information are the same, the controller may adjust a time for guiding deceleration or acceleration based on the first user propensity information.

When the driving situation is a speed camera approaching situation and the first user propensity information and the second user propensity information are the same, the controller may adjust a point for guiding deceleration based on the first user propensity information.

When the first user propensity information and the second user propensity information are not the same, the controller may control the user interface device to display a playable content list corresponding to the first user propensity information.

The sensor may further measure at least one of temperature and humidity in the vehicle, and when the first user propensity information and the second user propensity information are not the same, the controller may control an operation of an air conditioner or an operation of a window based on at least one of a first temperature and a first humidity corresponding to the first user propensity information.

The controller may control the user interface device to output at least one of an image and a voice message including the route guidance information.

The controller may adjust brightness of the image and color of the image based on the first user propensity information, and adjust tone of the voice message, utterance speed of the voice message, and volume of the voice message.

The controller may acquire the first user propensity information that is collected and analyzed by a user terminal other than the vehicle and stored in the server.

In accordance with another aspect of the present disclosure, a method of controlling a vehicle includes acquiring, by a sensor, behavior data of the vehicle; acquiring, by a controller, first user propensity information from a server; determining, by the controller, second user propensity information based on the behavior data of the vehicle; comparing, by the controller, the first user propensity information with the second user propensity information; and providing, by a user interface device, route guidance information based on a result of comparing the first user propensity information with the second user propensity information.

The determining of the second user propensity information may include determining the second user propensity information as a Patient Style, a Normal Style, or a Hasty Style.

The providing of the route guidance information may include when the first user propensity information and the second user propensity information are the same, providing the route guidance information based on the first user propensity information.

The method may further include acquiring, by a navigation system, road information and traffic information; and determining a driving situation based on the road information and the traffic information, and the acquiring of the first user propensity information may include acquiring the first user propensity information corresponding to the driving situation.

The providing of the route guidance information may include when the driving situation is an access road congestion state and the first user propensity information and the second user propensity information are the same, adjusting a point at which the lane change is guided to the access road based on the first user propensity information.

The providing of the route guidance information may include when the driving situation is a traffic light change situation and the first user propensity information and the second user propensity information are the same, adjusting a time for guiding deceleration or acceleration based on the first user propensity information.

The providing of the route guidance information may include when the driving situation is a speed camera approaching situation and the first user propensity information and the second user propensity information are the same, adjusting a point for guiding deceleration based on the first user propensity information.

The method may further include when the first user propensity information and the second user propensity information are not the same, displaying, by a user interface device, a list of playable content corresponding to the first user propensity information.

The method may further include measuring, by the sensor, at least one of temperature and humidity in the vehicle; and when the first user propensity information and the second user propensity information are not the same, controlling an operation of an air conditioner or an operation of a window based on at least one of a first temperature and a first humidity corresponding to the first user propensity information.

The providing of the route guidance information may include outputting at least one of an image and a voice message including the route guidance information.

The outputting at least one of an image and a voice message may include adjusting brightness of the image and color of the image based on the first user propensity information, and adjusting tone of the voice message, utterance speed of the voice message, and volume of the voice message based on the first user propensity information.

The acquiring of the first user propensity information may include acquiring the first user propensity information that is collected and analyzed by a user terminal other than the vehicle and stored in the server.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Like reference numerals refer to like elements throughout the specification. Not all elements of forms of the disclosure will be described, and description of what are commonly known in the art or what overlap each other in the forms will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

It will be understood that, although the terms first, second, third, etc., may be used herein to describe various elements, it should not be limited by these terms. These terms are only used to distinguish one element from another element. As used herein, the singular forms "a," "an" and "the" are intended to include the plural forms as well, unless the context clearly indicates otherwise.

As used herein, the terms "portion," "unit," "block," "member," or "module" refer to a unit that can perform at least one function or operation. For example, these terms may refer to at least one process which is performed by at least one piece of hardware such as a field-programmable gate array (FPGA) and an application specific integrated circuit (ASIC), and at least one piece of software stored in a memory or a processor.

An identification code is used for the convenience of the description but is not intended to illustrate the order of each step. Each of the steps may be implemented in an order different from the illustrated order unless the context clearly indicates otherwise.

The principle and some forms of the present disclosure will now be described with reference to the accompanying drawings.

Figure 1:
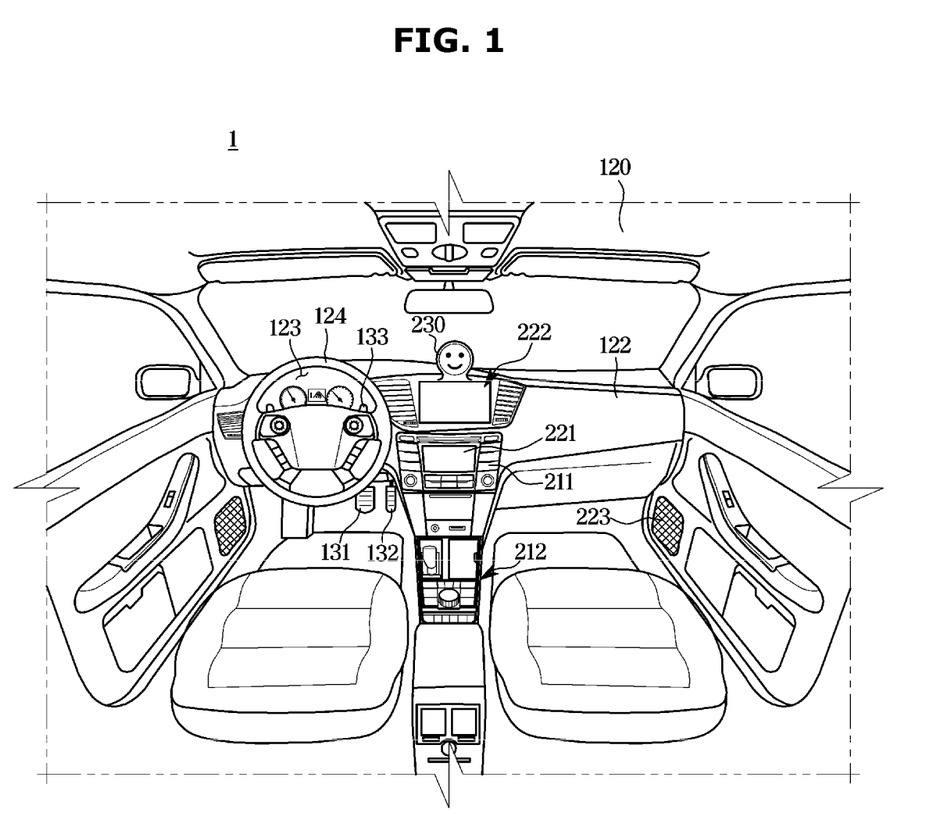
FIG. 1 shows an internal configuration of a vehicle in one form of the present disclosure.

FIG. 1 shows an internal configuration of a vehicle in some forms of the present disclosure.

Referring to FIG. 1, an interior 120 of a vehicle 1 includes a seat, a dashboard 122, and a cluster 123. The cluster 123 may include a tachometer, a speedometer, a water temperature gauge, a fuel gauge, a turn signal indicator, a head light indicator, a seat belt warning light, an odometer, a tachograph, a gearshift position indicator, a door open warning light, a low fuel warning light, a low oil pressure warning light, a tire pressure warning light. The cluster 123 may be implemented in a digital manner. The cluster 123 of the digital manner may display vehicle information and driving information as images.

The vehicle 1 includes a center fascia. The center fascia includes a steering wheel 124 for operating the traveling direction of the vehicle 1, a plurality of buttons 211, and 212 associated with various functions of the vehicle 1, an air vent, a cigar jack, a multi terminal, a display 221, an AVN device 222, etc. The vehicle 1 may include at least one speaker 223 mounted on the dashboard 122 and the door, and an Artificial Intelligence (AI) device 230 installed in the dashboard 122.

The vehicle 1 may include an air conditioner, and a window that can be opened and closed may be installed on the door. A controller 600 may control operation of the air conditioner and operation (opening and closing) of the window.

The Artificial Intelligence (AI) device 230 may receive voice commands from a user and operate various functions of the vehicle 1 and respond to a user's query. The AI device 230 may include at least one of a microphone, a speaker, and a display. The AI device 230 may output a dynamic character image.

A chassis of the vehicle 1 may further include a power generating device, a power transmitting device, a driving device, a steering device 270, a braking device, an accelerating device, a suspension device, a transmission device, a fuel device, and wheels. As an example of the braking device, a brake pedal 131 may be provided inside the vehicle 1, and an acceleration pedal 132 may be provided inside the vehicle 1 as an example of the accelerating device.

Figure 2:
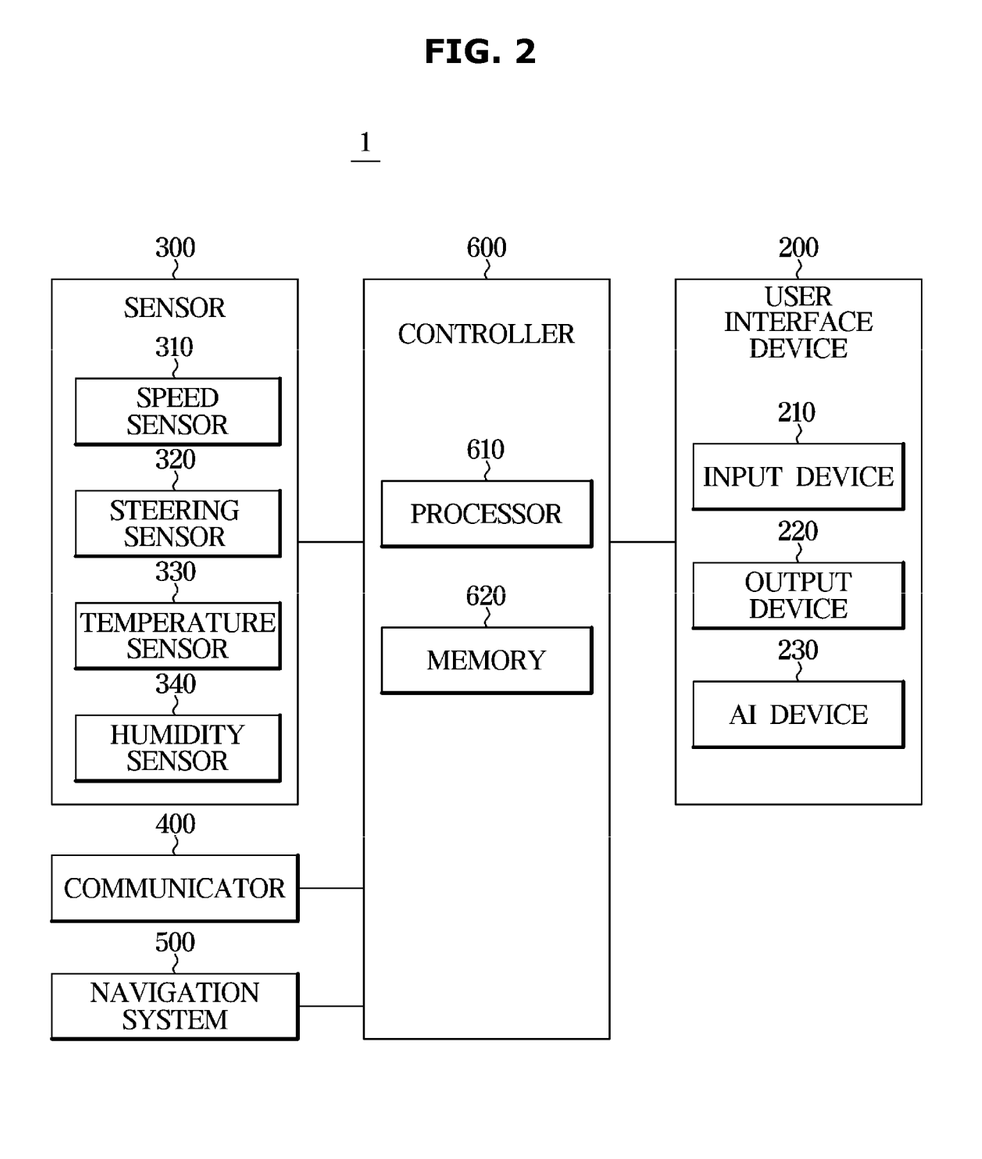
FIG. 2 shows a control block diagram of the vehicle in one form of the present disclosure.
Figure 3:
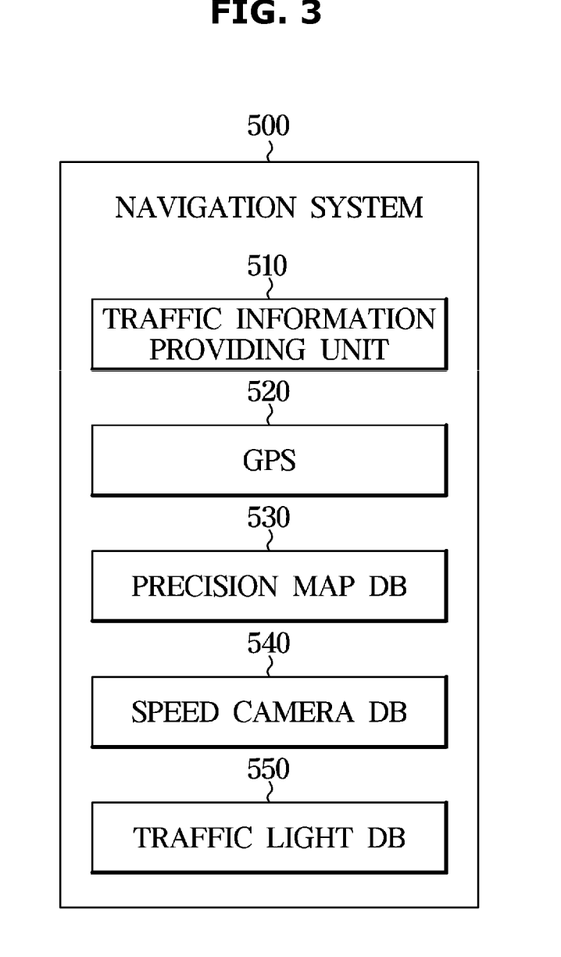
FIG. 3 shows a configuration diagram of a navigation system in one form of the present disclosure.

FIG. 2 shows a control block diagram of the vehicle in some forms of the present disclosure. FIG. 3 shows a configuration diagram of a navigation system in some forms of the present disclosure.

Referring to FIG. 2, the vehicle 1 includes a user interface device 200, a sensor 300, a communicator 400, a navigation system 500, and the controller 600.

The user interface device 200 may be defined as including an input device 210, an output device 220, and the AI device 230. In addition, the user interface device 200 may include an infotainment device. The input device 210 may include a plurality of buttons 211 and 212, a jog dial, a touch pad, and the like associated with various functions of the vehicle 1 provided in the center fascia and the head unit. Also, the touch panel provided on the display of the AVN apparatus 222 and the touch panel provided on the display 221 of the head unit correspond to the input apparatus 210. The output device 220 includes the display 221 of the head unit, the display of the AVN device 222, and at least one speaker 223 installed in the dashboard 122 and the door. The user interface device 200 may receive commands from a user and provide route guidance information.

The display 221 of the head unit and the display of the AVN device 222 may be a light emitting diode (LED) panel, an organic light emitting diode (OLED) panel, or a liquid crystal display panel.

The sensor 300 may include various sensors. For example, the vehicle 1 may include a proximity sensor for sensing obstacles or other vehicles on the front, rear or side, a rain sensor for detecting precipitation, a speed sensor 310 for detecting the speed of the wheel of the vehicle, a lateral acceleration sensor for detecting the lateral acceleration of the vehicle, a yaw rate sensor for detecting a change in the angular velocity of the vehicle, Gyro sensors, a steering sensor 320 for detecting the rotation of the steering wheel and the running direction of the vehicle, a temperature sensor 330 for measuring the temperature in the vehicle, a humidity sensor 340 for measuring humidity in the vehicle, etc.

The sensor 300 may acquire behavior data of the vehicle 1 and transmit the behavior data of the vehicle 1 to the controller 600. For example, the speed sensor 310 acquires the speed change data according to the acceleration or deceleration of the vehicle 1, and the steering sensor 320 may obtain steering angle change data corresponding to the movement of the steering wheel 124.

The controller 600 may obtain first user propensity information from a server through the communicator 400. The controller 600 may determine second user propensity information based on the behavior data of the vehicle. The controller 600 compares the first user propensity information with the second user propensity information, and control the user interface device 300 to provide route guidance information based on the comparison result.

The communicator 400 may exchange data with an external device. The communicator 400 may communicate with the server to transmit and receive data. The communicator 400 may receive the first user propensity information from the server under the control of the controller 600. The communicator 400 may be a communication circuit to which various communication technologies can be applied.

The communicator 400 may receive data from outside using a wireless communication technology such as Vehicle-to-Vehicle (V2V) communication, Wi-Fi, Wireless Local Area Network (WLAN), Ultra-mobile broadband (UMB), GPS, Long Term Evolution (LTE), etc. Also, the communicator 400 may perform wired communication.

The navigation system 500 may acquire road information and traffic information from an external device through the communicator 400. The road information is specific information on the road on which the vehicle 1 is traveling and includes information such as the position of the access road, the position of the traffic light, the state of the traffic light, the change time of the traffic light, a location of the speed camera, and so on. The traffic information may include traffic congestion information on the road.

The navigation system 500 is controlled by the controller 600 and configured to generate a traveling route of the vehicle 1 based on road information and traffic information. When the user inputs a destination using the user interface device 200, the navigation system 500 may generate a travel route to a destination and generate route guidance information.

Referring to FIG. 3, the navigation system 500 includes a traffic information providing unit 510, a global positioning system (GPS) unit 520, a precision map database 530, a speed camera database 540, and a traffic light database 550.

The traffic information providing unit 510 obtains the traffic congestion information on the driving road and provides the traffic congestion information to the user, and the GPS 520 may acquire the current position data of the vehicle 1. The precision map database 530 stores map data, the speed camera database 540 stores position data of a speed camera. The traffic light database 550 may store position data of the traffic lights, status information of the traffic lights, and time information regarding changes of the traffic lights.

The controller 600 may control the navigation system 500 to generate route guidance information which includes the traffic information, the position of the speed camera, the distance to the speed camera, the position of the traffic light, the status of the traffic light, time information regarding changes of the traffic lights, etc.

Meanwhile, the controller 600 of the vehicle 1 may determine a driving situation based on road information and traffic information obtained by the navigation system 500. For example, the driving situation may be an access road congestion state, a traffic light change situation, or a speed camera approaching situation. The traffic light change situation may mean a situation where a short time is left until the traffic light changes from green to red while the vehicle 1 approaches the traffic light.

The controller 600 may include at least one processor 610 for executing a program related to the operation of the vehicle 1 and at least one memory 620 for storing the program. The memory 620 and the processor 610 included in the controller 600 may be integrated on one chip or may be physically separated.

The controller 600 may include Electronic Control Unit (ECU) that controls driving of the power generating device, the power transmitting device, the driving device, the steering device 270, the braking device, the accelerating device, the suspension device, the transmission device, the fuel device, safety devices and various sensors 300.

Figure 4:
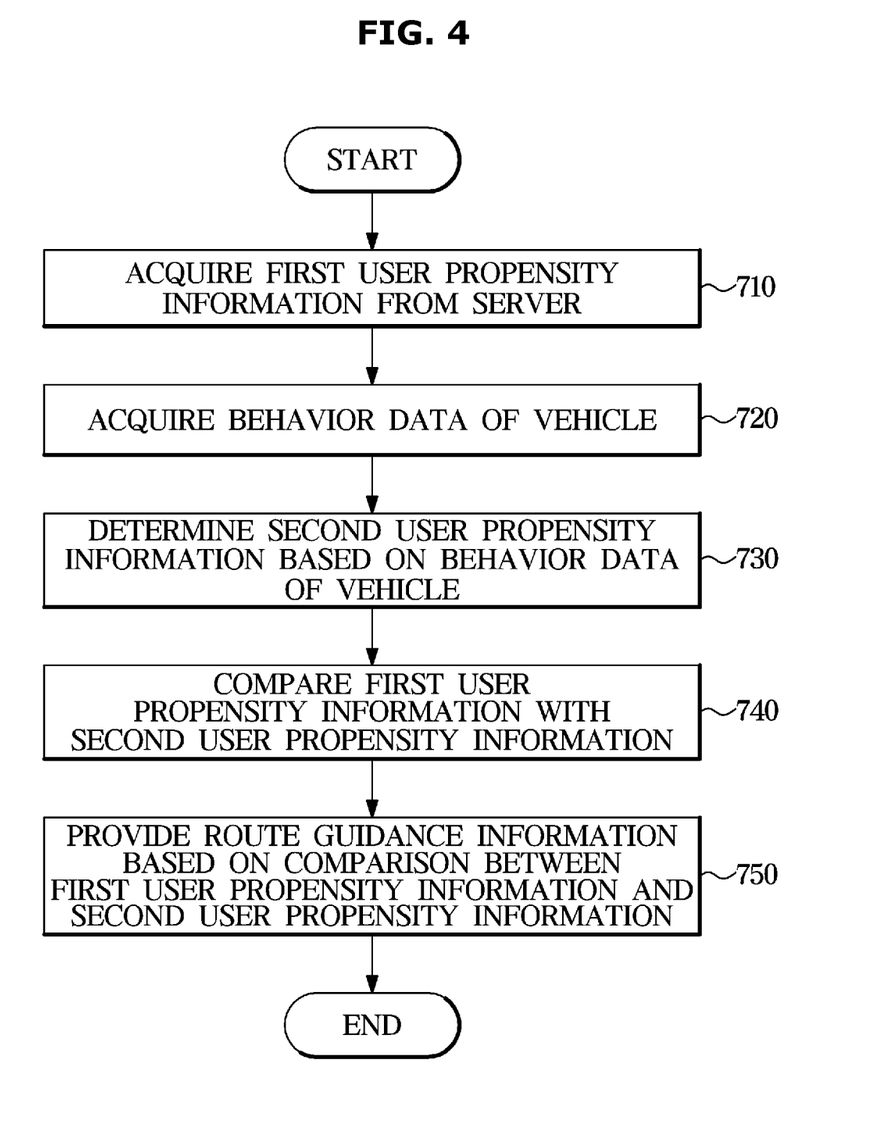
FIG. 4 is a flow chart illustrating method of controlling the vehicle in one form of the disclosure.

FIG. 4 is a flow chart illustrating method of controlling the vehicle in some forms of the present disclosure.

Referring to FIG. 4, the controller 600 of the vehicle 1 may obtain the first user propensity information from the server through the communicator 400 in operation 710. The first user propensity information refers to the user's usual propensity information. The first user propensity information may be data collected and analyzed by a user terminal other than the vehicle and stored in the server. For example, the first user propensity information may be data collected and analyzed by a user's smartphone, wearable device, or the like. The first user propensity information may be generated based on a user's smartphone usage pattern, a schedule stored in the smartphone, a tone of a voice call through the smartphone, a pulse rate measured by the wearable device, and the like.

Also, the first user propensity information may be information obtained by collecting the driving style of the user corresponding to a specific driving situation. The first user propensity information may mean the average propensity information of a user appearing in a specific driving situation. The first user propensity information may be a Patient Style, a Normal Style, or a Hasty Style.

The controller 600 may obtain the behavior data of the vehicle 1 from the sensor 300 in operation 720. The controller 600 may determine the second user propensity information based on the behavior data of the vehicle in operation 730. The second user propensity information means the current propensity information of the user. The controller 600 may determine the second user propensity information of the user based on the velocity change data of the vehicle 1 and the steering angle change data. For example, the controller 600 may determine the second user propensity information to be a Patient Style, a Normal Style, or a Hasty Style.

The first user propensity information or the second user propensity information indicates a degree of impatience of the user. The Patient Style represents the lowest impatience, the Normal Style represents the average impatience, and the Hasty Style represents the highest impatience.

The controller 600 may compare the first user propensity information with the second user propensity information in operation 740, and control the user interface device 200 to provide route guidance information based on the comparison result in operation 750. When the first user propensity information and the second user propensity information are the same, the controller 600 may provide the route guidance information based on the first user propensity information.

When the first user propensity information and the second user propensity information are not the same, the controller 600 may control the user interface device 200 to display a playable content list corresponding to the first user propensity information. The controller 600 may control the user interface device 200 to display the playable content list corresponding to the first user propensity information and display the content selected by the user. In other words, in order to change the user's current state to the first user propensity information indicating the usual propensity (state), the controller 600 may control the user interface device 200.

In addition, when the first user propensity information and the second user propensity information are not the same, the controller 600 may control the operation of the air conditioner or the operation (opening and closing) of the window based on at least one of a first temperature and a first humidity corresponding to the first user propensity information. The controller 600 may control the air conditioner or the window which are the functional device of the vehicle 1, to change the current state of the user to the first user propensity information indicating the usual propensity (state). That is, the controller 600 may control the air conditioner or the window to adjust the current temperature and the current humidity in the vehicle 1 to the first temperature and the first humidity, respectively.

The user interface device 200 may output a dynamic character image corresponding to the first user propensity information or the second user propensity information. The route guidance information may be provided by dynamic character images. Dynamic character images may have various characteristics.

The user interface device 200 may output at least one of an image and a voice message including the route guidance information. The controller 600 may adjust the brightness and color of the image and adjust tone of the voice message, utterance speed of the voice message, and volume of the voice message, based on the first user propensity information or the second user propensity information.

Figure 5:
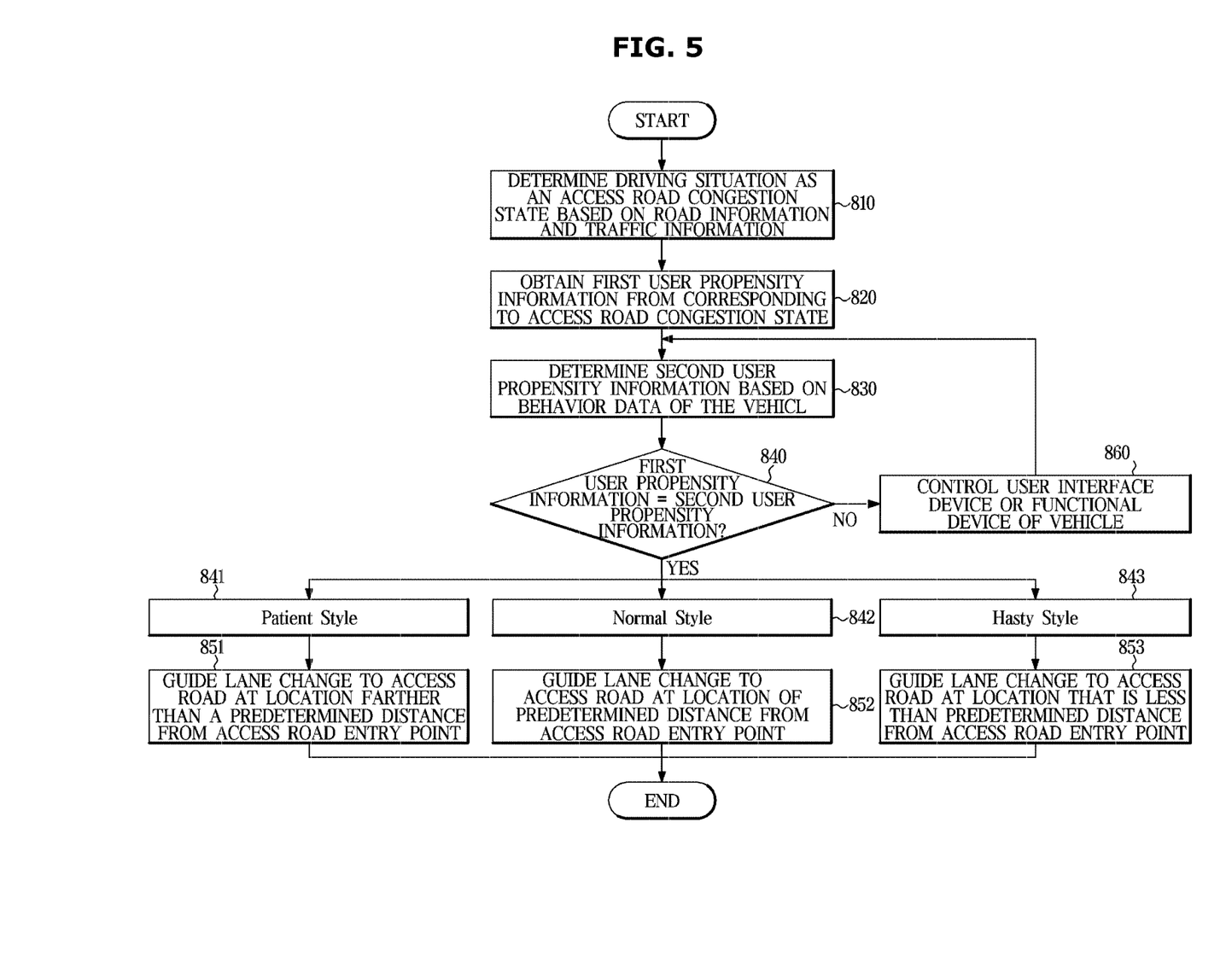
FIG. 5 illustrates a method for providing route guidance information when a driving situation is an access road congestion state.

FIG. 5 illustrates a method for providing route guidance information when a driving situation is an access road congestion state.

Referring to FIG. 5, the controller 600 may determine the driving situation as an access road congestion state based on road information and traffic information acquired by the navigation system 500 in operation 810. The controller 600 may obtain the first user propensity information from the server corresponding to the access road congestion state in operation 820. The controller 600 may determine the second user propensity information based on the behavior data of the vehicle 1 acquired from the sensor 300 in operation 830. For example, the controller 600 may determine the second user propensity information for the access road congestion state as the Patient Style, the Normal Style, or the Hasty Style. The controller 600 may compare the first user propensity information with the second user propensity information in operation 840, and control the user interface device 200 to provide route guidance information based on the comparison results. When the first user propensity information and the second user propensity information are the same, the controller 600 may provide the route guidance information based on the first user propensity information.

For example, when the second user propensity information is determined as the Patient Style in operation 841, the controller 600 may control the user interface device 200 to inform of the lane change to the access road at a location farther than a predetermined distance from the access road entry point in operation 851. The predetermined distance may be 600 meters from the entry point of the access road. That is, when the second user propensity information of the user is the Patient Style, the lane change guidance may be provided at a point 1 km away from the access road entry point.

When the second user propensity information is determined as the Normal Style in operation 842, the controller 600 may control the user interface device 200 to guide the lane change to the access road at a location of the predetermined distance from the access road entry point in operation 852. That is, the lane change may be guided at a point 600 meters from the access road entry point.

When the second user propensity information is determined as the Hasty style in operation 843, the controller 600 may control the user interface device 200 to guide the lane change to the access road at a location that is less than a predetermined distance from the access road entry point in operation 853. That is, when the driving style of the user is the Hasty style, the lane change guidance may be provided from a point 200 meters from the entry point of the access road.

When the first user propensity information and the second user propensity information are not the same, the controller 600 may control the user interface device 200 or a functional device of the vehicle 1 in operation 860.

For example, when the first user propensity information and the second user propensity information are not the same, the controller 600 may control the user interface device 200 to display the playable content list corresponding to the first user propensity information. The controller 600 may control the user interface device 200 to display the content selected by the user. That is, in order to change the user's current state to the first user propensity information indicating the usual propensity (state), the controller 600 may control the user interface device 200.

In addition, when the first user propensity information and the second user propensity information are not the same, the controller 600 may control the operation of the air conditioner or the operation (opening and closing) of the window based on at least one of the first temperature and the first humidity corresponding to the first user propensity information. That is, the controller 600 may control the air conditioner or the window to adjust the current temperature and the current humidity in the vehicle 1 to the first temperature and the first humidity, respectively.

As described above, the vehicle 1 may provide the route guidance information by adjusting a point or a time of guiding the lane change to the access road based on the user's propensity information. Therefore, the user's satisfaction with the guidance of the route can be improved.

Figure 6:
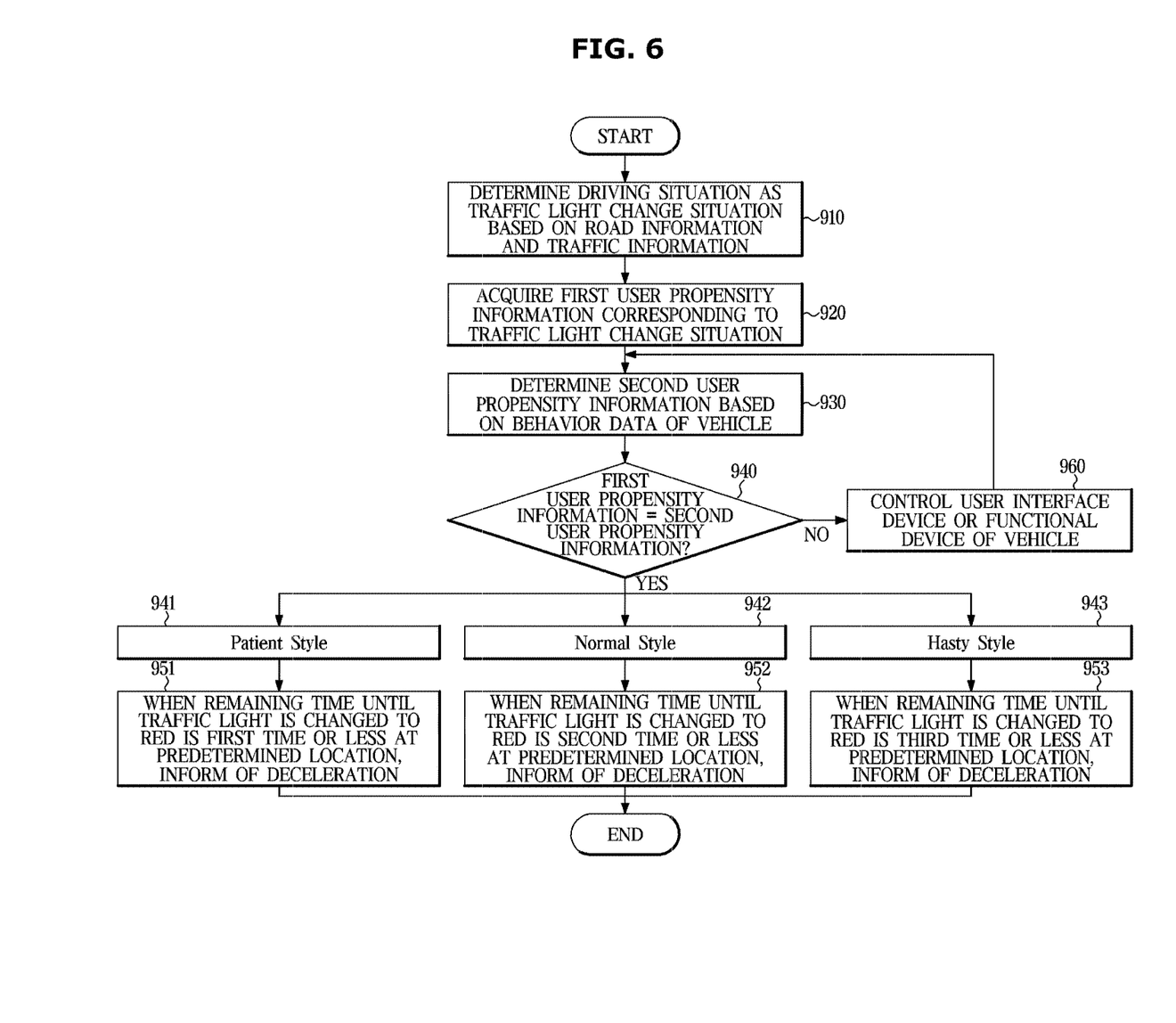
FIG. 6 illustrates a method of providing route guidance information when a driving situation is a traffic light change situation.

FIG. 6 illustrates a method of providing route guidance information when a driving situation is a traffic light change situation.

Referring to FIG. 6, the controller 600 may determine the driving situation as the traffic light change situation based on road information and traffic information obtained by the navigation system 500 in operation 910. The traffic light change situation may mean a situation where a short time is left until the traffic light changes from green to red while the vehicle 1 approaches the traffic light. The controller 600 may acquire the first user propensity information corresponding to the traffic light change situation from the server in operation 920. The controller 600 may determine the second user propensity information based on the behavior data of the vehicle 1 acquired from the sensor 300 in operation 930. For example, the controller 600 may determine the second user propensity information for the traffic light change situation as the Patient Style, the Normal Style, or the Hasty Style.

The controller 600 can compare the first user propensity information with the second user propensity information in operation 940, and control the user interface device 200 to provide the route guidance information based on the comparison results. When the first user propensity information and the second user propensity information are the same, the controller 600 may provide the route guidance information based on the first user propensity information.

For example, when the second user propensity information is determined as the Patient Style in operation 941, and at a location a predetermined distance from the traffic light location, when a remaining time until the traffic light is changed to red is the first time or less, the controller 600 may control the user interface device 200 to inform of the deceleration in operation 951. The predetermined distance from the traffic light location may be 100 m, and the first time may be 10 seconds. That is, when a relatively long time remains until the traffic light changes to red, deceleration may be informed.

When the second user propensity information of the user is determined as the Normal Style in operation 942, and at the location the predetermined distance from the traffic light location, when the remaining time until the traffic light is changed to red is the second time or less, the controller 600 may control the user interface device 200 to inform of the deceleration in operation 952. Conversely, when the remaining time until the traffic light changes to red exceeds the second time, the controller 600 may control the user interface device 200 to inform of acceleration. The predetermined distance may be 100 m, and the second time may be 7 seconds.

In addition, when the second user propensity information is determined as the Hasty Style in operation 943, and at the location the predetermined distance from the traffic light location, when the remaining time until the traffic light is changed to red is the third time or less, the controller 600 may control the user interface device 200 to inform of deceleration in operation 953. Conversely, when the remaining time until the signal lamp changes to red exceeds the third time, the controller 600 may control the user interface device 200 to inform of acceleration. The predetermined distance may be 100 m, and the third time may be 4 seconds. That is, the deceleration may be informed when the relatively short time remains until the traffic light changes to red.

The predetermined distance, the first time, the second time and the third time are not limited to the above-described numerical values. Within various numerical ranges, the first time may be set to be longer than the second time, and the second time may be set to be longer than the third time. As described above, the vehicle 1 may provide the route guidance information by determining deceleration or acceleration in the situation of approaching the traffic light. Therefore, the user's satisfaction with the guidance of the route can be improved.

Figure 7:
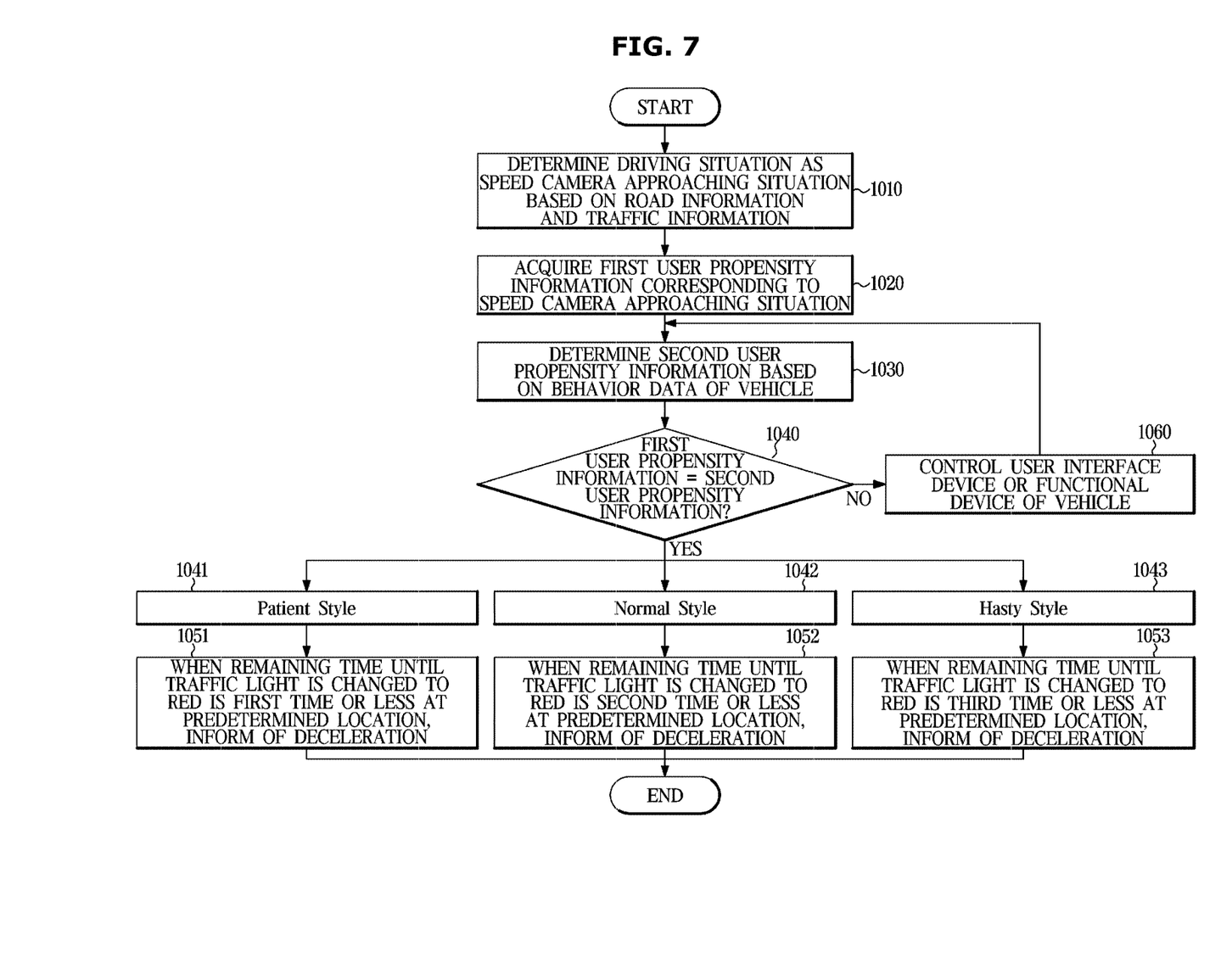
FIG. 7 illustrates a method of providing route guidance information when a driving situation is a speed camera approaching situation.

FIG. 7 illustrates a method of providing route guidance information when a driving situation is a speed camera approaching situation.

Referring to FIG. 7, the controller 600 may determine the driving situation as the speed camera approaching situation based on the road information and traffic information obtained by the navigation system 500 in operation 1010. The controller 600 may acquire the first user propensity information corresponding to the speed camera approaching situation from the server in operation 1020. The controller 600 may determine the second user propensity information based on the behavior data of the vehicle 1 acquired from the sensor 300 in operation 1030. For example, the controller 600 may determine the second user propensity information regarding the speed camera approaching situation as the Patient Style, the Normal Style, or the Hasty Style.

The controller 600 may compare the first user propensity information with the second user propensity information in operation 1040, and control the user interface device 200 to provide the route guidance information based on the comparison results. When the first user propensity information and the second user propensity information are the same, the controller 600 may provide the route guidance information based on the first user propensity information.

For example, when the second user propensity information is determined as the Patient Style in operation 1041, the controller 600 may control the user interface device 200 to inform of deceleration at a location farther than a predetermined distance from the location of the speed camera in operation 1051. The predetermined distance may be 600 meters from the location of the speed camera. That is, when the second user propensity information of the user is the Patient Style, deceleration may be informed from a location 1 km away from the location of the speed camera.

When the second user propensity information is determined as the Normal Style in operation 1042, the controller 600 may control the user interface device 200 to inform of deceleration at a location of the predetermined distance from the location of the speed camera in operation 1052. Deceleration may be informed from a location 600 m from the location of the speed camera.

When the second user propensity information is determined as the Hasty style in operation 1043, the controller 600 may control the user interface device 200 to inform of deceleration at a location closer than a predetermined distance from the location of the speed camera in operation 1053. That is, when the driving style of the user is the Hasty style, deceleration may be informed from a position 200 meters from the location of the speed camera. As described above, the vehicle 1 may provide the route guidance information by adjusting a point or a time of deceleration while the vehicle approaches the speed camera, based on the user's propensity information. Therefore, the user's satisfaction with the guidance of the route can be improved.

Figure 8:
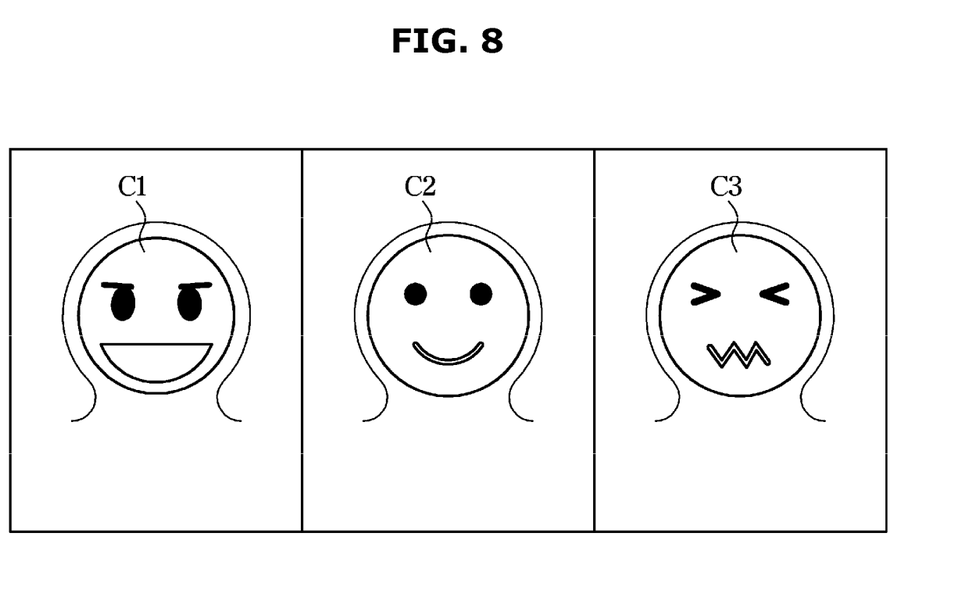
FIG. 8 shows a dynamic character image output by a user interface device in response to a user's propensity.

FIG. 8 shows a dynamic character image output by a user interface device in response to a user's propensity.

As described above, the user interface device 200 may output the dynamic character image corresponding to the route guidance style. Route guidance information may be provided by dynamic character images.

Dynamic character images may have various characteristics. Referring to FIG. 8, the user interface device 200, for example, the AI device 230 may output the dynamic character image having a character corresponding to the user's propensity information. When the first user propensity information or the second user propensity information is the Patient Style, the controller 600 may control the AI device 230 to output C1 character image. When the first user propensity information or the second user propensity information is the Normal Style, the controller 600 may control the AI device 230 to output C2 character image. When the first user propensity information or the second user propensity information is the Hasty Style, the controller 600 may control the AI device 230 to output C3 character image. Not only the AI device 230 but also the AVN device 222 can output dynamic character images.

According to the vehicle and method thereof as described above, it is possible to enhance the user's satisfaction with the route guidance by providing route guidance information corresponding to the user's usual propensity.

When providing route guidance information, by expressing emotion or character corresponding to the user's usual propensity, it is possible to increase the recognition rate of the user to the route guidance information.

The present propensity of the user can be guided to the normal propensity by providing the driving environment corresponding to the normal propensity of the user.

Meanwhile, some forms of the present disclosure may be implemented in the form of a recording medium storing instructions that are executable by a computer. The instructions may be stored in the form of a program code, and when executed by a processor, the instructions may generate a program module to perform operations of some forms of the present disclosure. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle comprising:
   a sensor configured to acquire behavior data of the vehicle;
   a communicator configured to communicate with a server;
   a user interface configured to receive commands from a user and provide route guidance information; and
   a controller configured to:
   acquire first user propensity information from the server through the communicator;
   determine second user propensity information based on the behavior data of the vehicle;
   compare the first user propensity information with the second user propensity information;
   control the user interface to provide the route guidance information based on a result of the comparison;
   output a voice message including the route guidance information using the user interface; and adjust a tone of the voice message, an utterance speed of the voice message, and a volume of the voice message based on the first user propensity information.

2. The vehicle of claim 1, wherein the controller is further configured to determine that the second user propensity information is a Patient Style, a Normal Style, or a Hasty Style.

3. The vehicle of claim 1, wherein the controller is further configured to provide the route guidance information based on the first user propensity information when the first user propensity information matches the second user propensity information.

4. The vehicle of claim 1, wherein the vehicle further comprises a navigation system configured to acquire road information and traffic information and wherein the controller is further configured to determine a driving situation based on the road information and the traffic information and to acquire the first user propensity information corresponding to the driving situation.

5. The vehicle of claim 4, wherein the controller is further configured to guide the vehicle along a road based on the first user propensity information when the driving situation approaches the road in a congested state and the first user propensity information matches the second user propensity information.

6. The vehicle of claim 4, wherein the controller is further configured to control the vehicle to decelerate or accelerate based on the first user propensity information when the driving situation approaches a traffic light change and the first user propensity information matches the second user propensity information.

7. The vehicle of claim 4, wherein the controller is further configured to control the vehicle to decelerate based on the first user propensity information when the driving situation approaches a speed camera and the first user propensity information matches the second user propensity information.

8. The vehicle of claim 1, wherein the controller is further configured to control the user interface to display a playable content list corresponding to the first user propensity information on the user interface when the first user propensity information does not match the second user propensity information.

9. The vehicle of claim 1, wherein:
the sensor is further configured to measure at least one of temperature or humidity in the vehicle, and
the controller is further configured to control an air conditioner or a window based on at least one of a first temperature or a first humidity corresponding to the first user propensity information when the first user propensity information does not match the second user propensity information.

10. The vehicle of claim 1, wherein the controller is further configured to output an image on the user interface and adjust a brightness of the image and a color of the image based on the first user propensity information.

11. The vehicle of claim 1, wherein the controller is further configured to acquire the first user propensity information through a user terminal, and wherein the user terminal is configured to store the first user propensity information in the server.

12. A method of controlling a vehicle comprising:
acquiring, by a sensor, behavior data of the vehicle;
acquiring, by a controller, first user propensity information from a server;
determining, by the controller, second user propensity information based on the behavior data of the vehicle;
comparing, by the controller, the first user propensity information with the second user propensity information;
controlling a user interface to provide route guidance information based on a result of the comparing;
generating, by the controller, an electronic voice message that includes the route guidance information, wherein a tone, an utterance speed, and a volume of the electronic voice message has been adjusted based on the first user propensity information; and
outputting, by the user interface, the electronic voice message.

13. The method of claim 12 further comprising:
outputting an image on the user interface; and
adjusting, by the controller, a brightness of the image and a color of the image based on the first user propensity information.

14. The method of claim 13, wherein determining the second user propensity information comprises determining, by the controller, that the second user propensity information is a Patient Style, a Normal Style, or a Hasty Style.

15. The method of claim 13, wherein providing the route guidance information comprises when the first user propensity information matches the second user propensity information, providing, by the controller, the route guidance information based on the first user propensity information.

16. The method of claim 13, wherein the method further comprises:
acquiring, by a navigation system, road information and traffic information;
determining, by the controller, a driving situation based on the road information and the traffic information; and
acquiring, by the controller, the first user propensity information corresponding to the driving situation.

17. The method of claim 16, wherein providing the route guidance information comprises when the driving situation approaches a road in a congested state and the first user propensity information matches the second user propensity information, guiding the vehicle, by the controller, to the road based on the first user propensity information.

18. The method of claim 16, wherein providing the route guidance information comprises when the driving situation approaches a traffic light change and the first user propensity information matches the second user propensity information, decelerating or accelerating the vehicle, by the controller, based on the first user propensity information.

19. The method of claim 16, wherein providing the route guidance information comprises when the driving situation approaches a speed camera and the first user propensity information matches the second user propensity information, decelerating the vehicle, by the controller, based on the first user propensity information.

20. The method of claim 13, wherein the method further comprises when the first user propensity information does not match the second user propensity information, displaying, by the controller, a playable content list corresponding to the first user propensity information on the user interface.

21. The method of claim 13, wherein the method further comprises:
measuring, by the sensor, at least one of temperature or humidity in the vehicle; and
when the first user propensity information does not match the second user propensity information, controlling, by the controller, an air conditioner or a window based on at least one of a first temperature or a first humidity corresponding to the first user propensity information.

22. The method of claim 13, wherein acquiring the first user propensity information comprises acquiring, by the controller, the first user propensity information through a user terminal, wherein the user terminal is configured to store the first user propensity information in the server.

23. The method of claim 13, wherein acquiring the behavior data of the vehicle comprises measuring a speed of the vehicle, sensing a steering of the vehicle, measuring a temperature or measuring a humidity.

24. A vehicle comprising:
a seat within an interior of the vehicle;
a steering wheel within the interior of the vehicle adjacent the seat;
a cluster configured to display information to a user located in the seat;
a sensor configured to acquire behavior data of the vehicle;
a communicator configured to communicate with a server;
a user interface configured to receive commands from the user and to provide route guidance information; and
a controller configured to:
acquire first user propensity information from the server through the communicator;
determine second user propensity information based on the behavior data of the vehicle;
compare the first user propensity information with the second user propensity information;
control the user interface to provide the route guidance information based on a result of the comparison;
output at least one of an image or a voice message including the route guidance information on the user interface; and
adjust a tone of the voice message, an utterance speed of the voice message, and a volume of the voice message based on the first user propensity information.

* * * * *